April 2, 1929.  W. C. MILES  1,707,407
FISH LURE
Filed Dec. 30, 1926
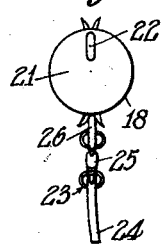
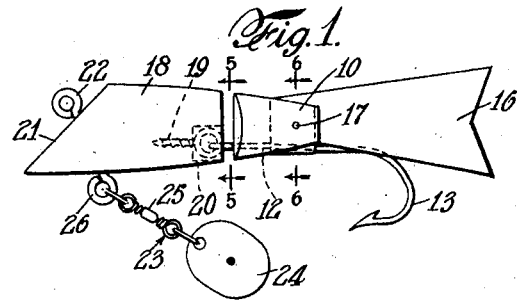
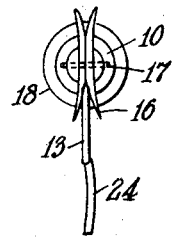
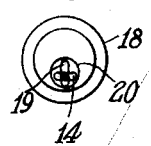
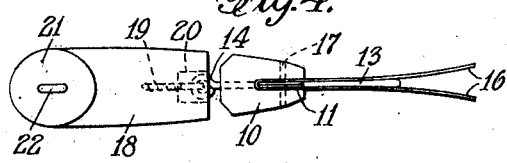
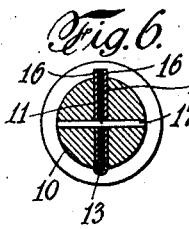
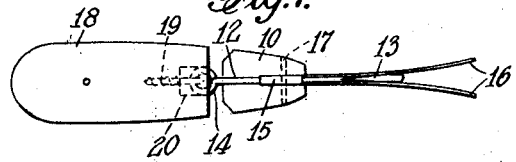
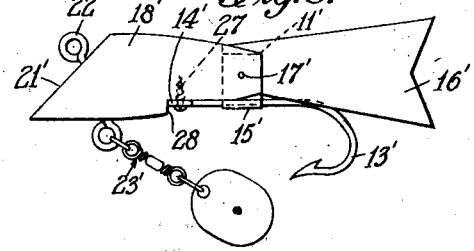
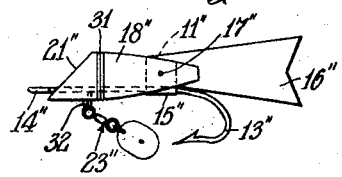
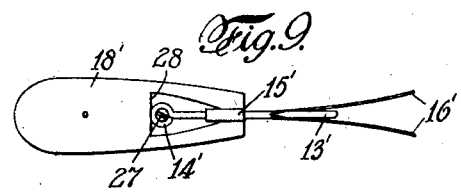
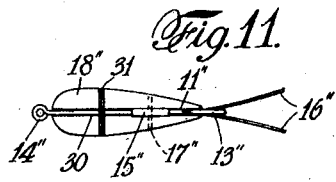
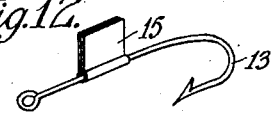
INVENTOR
William C. Miles Patented Apr. 2, 1929.

1,707,407

UNITED STATES PATENT OFFICE.

WILLIAM C. MILES, OF BROOKLYN, NEW YORK.

FISH LURE.

Application filed December 30, 1926. Serial No. 157,889.

This invention relates to fish lures and has for its general object the provision of an improved lure which is simple, effective, and cheap to manufacture.

Other objects and advantages of the invention will become apparent from the following description taken in connection with the accompanying drawings.

Figure 1 is a side elevation of one form of lure embodying the invention.

Figure 2 is an end view of the lure as viewed from the left in Figure 1.

Figure 3 is an end view of the lure as seen from the right in Figure 1.

Figure 4 is a plan view of the lure shown in Figure 1.

Figure 5 is a sectional view taken on line 5—5 of Figure 1.

Figure 6 is a sectional view taken on line 6—6 of Figure 1.

Figure 7 is a view of the lure shown in Figure 1 as seen from the bottom therein with the equilibrium interrupter detached for the sake of clearness.

Figure 8 is a side elevation of a modified form of lure embodying the invention.

Figure 9 is a view of the lure shown in Figure 8 as seen from the bottom therein with the equilibrium interrupter detached for the sake of clearness.

Figure 10 is a side elevation of another modified form of lure embodying the invention.

Figure 11 is a view of the lure shown in Figure 10 as seen from the bottom therein with the equilibrium interrupter detached for the sake of clearness.

Figure 12 is a perspective view of a fish hook having an anchoring device attached thereto.

Referring to Figures 1 to 7, a body piece 10 is provided with a transverse slot 11 and a longitudinal groove 12. The groove 12 is adapted for the reception of the shank of a fish hook 13 so arranged that the eye 14 of the hook is located at the front of the body piece 10. To the shank of the hook 13, is suitably secured, as by soldering, an anchoring device 15, herein shown as a strip of relatively thin metal, which is looped about the shank of the hook. This anchoring device 15 is adapted to enter the slot 11 and there engage a flexible tail piece 16, which is looped about the projecting portion of the anchoring device 15 and extends an appreciable distance out of the slot 11 at the rear of the body piece 10. A transverse rivet or pin 17 may be passed through the projecting portion of the anchoring device 15 and the body piece 10 in order to lock or secure the hook 13, anchoring device 15 and tail piece 16 in an assembled relation. Since the anchoring device 15 is rigidly attached to the hook 13 and is confined within the slot 11, it follows that the hook 13 is secured against rotation with respect to the body piece 10; and since the rivet or pin 17 passes through the body piece 10 and the projecting portion of the anchoring device 15, it follows that relative longitudinal movement between the body piece 10 and hook 13 is also prevented.

In the form of the invention shown in Figures 1 to 7 inclusive, the unitary structure, above described as including the body piece 10, hook 13, anchoring device 15, tail piece 16, and rivet or pin 17, is pivotally attached to the rear of a second body piece 18. In making this pivotal connection, the eye 14 of the hook 13 is utilized, such eye being connected to a screw-eye 19 which is screwed into the body piece 18, the ring portion of the screw-eye 19 being accommodated within an opening 20 formed in the rear of the body piece 18. This opening 20 is somewhat larger than the diameter of the eye of the hook 13 so as to permit unrestricted pivotal movement of the body piece 10 with respect to the body piece 18. The forward end of the body piece 18 is preferably so shaped or formed as to present a surface 21 which is inclined at an angle with respect to the longitudinal axis of the body piece 18 so as to induce the lure to dive when drawn through water. The body piece 18 carries at its forward end a screw-eye 22 which affords a convenient means by which the lure may be attached to a fishing line.

To the underneath side of the body piece 18, is attached an equilibrium interrupter 23, in the form of a well known type of spinner or attracter, which includes a spoon 24 suitably connected to a swivel 25. In connecting the equilibrium interrupter 23 to the body piece 18, a suitable screw-eye 26 may be employed.

Referring to Figures 8 and 9, a body piece 18' is employed. This body piece is formed with an inclined face 21', as in the case of the body piece 18, and is provided at its forward end with a screw-eye 22', by means of which the lure may be attached to a fishing line. The body piece 18' also carries suspended from its underneath side an equilibrium interrupter 23′ of the type above described. The hook 13′ is rigidly connected to the body piece 18′ by means of a screw 27, or the like, which is passed through the eye 14′ of the hook. In order that the shank of the hook 13′ may assume a position parallel or substantially parallel to the longitudinal axis of the body piece 18′, such body piece may be relieved or cut away as shown at 28. The tail piece 16′ is substantially identical with the above mentioned tail piece 16 and is held within a vertical slot 11′ at the rear of the body piece 18′ by means of an anchoring device 15′, which is secured to the shank of the hook 13′ and is identical with the anchoring device 15 above described. If desired, a suitable rivet or pin 17′ may be passed through the anchoring device 15′ and the rear end of the body piece 18′ in order to further secure the hook 13′ to the body piece and prevent the tail piece 16′ from slipping with respect to the body piece to which it is attached.

In Figures 10 and 11, the invention is shown as embodied in a miniature lure, particularly adapted for casting in accordance with well known fly casting methods. The body piece 18″ is formed at its forward end with an inclined face 21″, and is provided at its rear end with a vertical slot 11″, adapted for the reception of an anchoring device 15″, which is rigidly secured to the shank of the hook 13″, the anchoring device 15″ being adapted to engage a flexible tail piece 16″ and retain the same within the slot 11″. In this miniature lure, the shank of the hook 13″ is so positioned within a longitudinal groove 30 formed in the bottom of the body piece 18″ that the eye 14″ of the hook is located at the front of the body piece 18″, thereby affording a means by which the lure may be attached to a fishing line. In order to retain the fish hook 13″, anchoring device 15″, tail piece 16″ and body piece 18″ in an assembled relation, a rivet or pin 17″ may be employed, which rivet or pin is passed through the anchoring device 15″, the tail piece 16″ and the rear end of the body piece 18″. However, this rivet or pin 17″ may be omitted, in which case the hook 13″ and body piece 18″ may be secured together by a wrapping of thread 31, or the like, confined within a groove, not shown, which is formed in the body piece 18″ to a sufficient depth to enable the thread to engage the shank of the hook 13″. In the event the assembly is held together by means of the thread 31, rather than by the rivet or pin 17″, the hook is prevented from moving rearwardly with respect to the body piece 18″ by reason of the fact that the eye 14″ of the hook 13″ engages the front of the body piece 18″; and the hook 13″ is prevented from moving forward with respect to the body piece 18″ by reason of the fact that the anchoring device 15″ is rigidly secured to the shank of the hook 13″ and engages or substantially engages the bottom of the slot 11″. If desired, an equilibrium interrupter 23″, of the type shown in connection with the other forms of the invention, may be attached to the bottom of the body piece 18″, the connection being made in the present form of the invention, preferably, by means of a staple 32 or the like.

Each of the lures herein shown is of the diving type due to the presence of its inclined forward face, and in each case the equilibrium interrupter, due to the erratic movement of the spoon, rocks the body piece with its inclined forward face about the longitudinal axis of that body piece. As the lure is drawn through the water and as the body piece, with its inclined forward face, is rocked about the longitudinal axis of such body piece, a camming action is set up, first on one side of a plane passing vertically through the axis of the body piece and then upon the other side of such plane, with the result that the lure traverses a zig-zag course and a wave-like motion is set up in the tail piece. All of these movements lend a life like appearance to the lure, and particularly in the form of the invention shown in Figures 1 to 7 in which a relative pivotal movement is effected between the two body pieces as the lure is drawn through the water.

The equilibrium interrupter, employed in connection with the various forms of the invention, not only functions as a means for rocking the attached body piece about its longitudinal axis, as above described, but this interrupter, operating as it does at the point of the hook, also effectively serves as a weed, or like, guard for the hook, thereby eliminating to a very marked degree the possibility of fouling the lure. Furthermore, the equilibrium interrupter serves as an attracter and produces an illusionary effect of moving fins carried by the lure at a distance from the forward end thereof corresponding to the distance at which the spoon of the interrupter is located from the forward end of the lure.

What is claimed is:

1. In a fish lure, a body piece, having a portion cut away forming a slot therein, a flexible element associated with said body piece, a portion of said flexible element being confined within said slot, a fish hook, and an anchoring device directly associated with said fish hook and confined within said slot and there interlocked with said flexible element whereby said flexible element is attached to said body piece.

2. In a fish lure, a body piece, having a transverse slot formed therein, a flexible element projecting from said slot, a fish hook, and an anchoring device attached to said fish hook and confined within said slot and there interlocked with said flexible element whereby said flexible element is attached to said body piece.

3. In a fish lure, a body piece, a fish hook attached to said body piece, an anchoring device secured to said fish hook, and a flexible element embracing said anchoring device, said flexible element being interlocked with said anchoring device and thereby attached to said body piece.

4. In a fish lure, a body piece having a slot formed therein, a fish hook attached to said body piece, an anchoring device secured to said fish hook and projecting into said slot, and a flexible element projecting into said slot and therein embracing said anchoring device.

5. The combination with a diving fish lure body piece, a fish hook, and an equilibrium interrupter attached to said body piece and adapted to so operate when said body piece is drawn through the water as to rock said body piece about its longitudinal axis.

6. The combination with a diving fish lure body piece having a surface at its forward end inclined with respect to the axis of said body piece, a fish hook, and an equilibrium interrupter attached to said body piece and adapted to so operate when said body piece is drawn through water as to rock said body piece about its longitudinal axis whereby said body piece is caused to deviate first one way and then another from a straight line course.

7. The combination with diving fish lure body piece, a fish hook, and an equilibrium interrupter attached to said body piece and adapted to function immediately in front of the point of said fish hook as a weed guard for said fish hook and adapted to serve as a means to rock said body piece about its longitudinal axis as said body piece is drawn through water.

8. In a fish lure, a body piece having a slot formed therein, a fish hook, an anchoring device attached to the shank of said fish hook and extending into said slot, a second body piece pivotally connected to the eye of said hook and having a surface at its forward end inclined with respect to its axis, and an equilibrium interrupter attached to the second named body piece and adapted to so operate when said body pieces are drawn through water as to rock the second named body piece about its longitudinal axis whereby the second named body piece is caused to deviate first one way and then another from a straight line course.

9. In a fish lure, a body piece, a fish hook, a diving body piece pivotally connected to the first mentioned body piece, and an equilibrium interrupter attached to one of said body pieces and adapted to rock said diving body piece about its longitudinal axis whereby said diving body piece is caused to deviate first one way and then another from a straight line course.

10. In a fish lure, a body piece, a fish hook, a diving body piece pivotally connected to the first mentioned body piece, and an equilibrium interrupter attached to said diving body piece and adapted to rock said diving body piece about its longitudinal axis whereby said diving body piece is caused to deviate first one way and then another from a straight line course.

11. In a fish lure, a body piece, a fish hook carried by said body piece and including an eye, a diving body piece arranged at the front of the first mentioned body piece, means pivotally connecting said body pieces together and including said eye, and an equilibrium interrupter attached to said diving body piece and adapted to rock said diving body piece about its longitudinal axis whereby said diving body piece is caused to deviate first one way and then another from a straight line course.

12. In a fish lure, a body piece having a slot formed therein, an anchoring device confined within said slot, and a flexible element having a portion confined within said slot and therein embracing said anchoring device.

13. In a fish lure, a body piece having a slot formed therein, an anchoring device confined within said slot, a flexible element having a portion confined within said slot and therein embracing said anchoring device, and fastening means engaging said body piece and passing through said anchoring device and the confined portion of said flexible element.

14. In a fish lure, a body piece having a slot formed therein, an anchoring device confined within said slot, a flexible element having a portion confined within said slot and therein embracing said anchoring device, and a fish hook associated with said body piece and having its shank secured to and supported by said anchoring device.

15. In a fish lure, a body piece having a transverse slot at one end thereof, a fish hook, an anchoring device attached to the shank of the fish hook and projecting into said slot, and fastening means co-operating with said body piece and said anchoring device for securing said anchoring device within said slot.

16. In a fish lure, a body piece having a transverse slot at its rear end, a fish hook, an anchoring device directly associated with said fish hook and projecting into said slot, and fastening means co-operating with said body piece and said anchoring device for securing said anchoring device within said slot.

In testimony whereof, I have affixed my signature to this specification.

WILLIAM C. MILES.